(12) United States Patent
Jin et al.

(10) Patent No.: US 10,399,497 B2
(45) Date of Patent: Sep. 3, 2019

(54) VEHICLE DOOR MIRROR

(71) Applicant: KABUSHIKI KAISHA HONDA LOCK, Miyazaki-shi, Miyazaki (JP)

(72) Inventors: Satoshi Jin, Miyazaki (JP); Yasuyuki Eto, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 15/536,343

(22) PCT Filed: Dec. 14, 2015

(86) PCT No.: PCT/JP2015/084896
§ 371 (c)(1),
(2) Date: Jun. 15, 2017

(87) PCT Pub. No.: WO2016/098719
PCT Pub. Date: Jun. 23, 2016

(65) Prior Publication Data
US 2017/0327043 A1 Nov. 16, 2017

(30) Foreign Application Priority Data
Dec. 19, 2014 (JP) ................. 2014-257607

(51) Int. Cl.
*B60R 1/074* (2006.01)
*B60R 1/12* (2006.01)
*B60Q 1/26* (2006.01)

(52) U.S. Cl.
CPC ............ *B60R 1/074* (2013.01); *B60Q 1/2665* (2013.01); *B60R 1/1207* (2013.01)

(58) Field of Classification Search
CPC ...... B60R 1/074; B60R 1/1207; B60Q 1/2665
(Continued)

(56) References Cited

U.S. PATENT DOCUMENTS 5,781,354 A * 7/1998 Sakata .................... B60R 1/074
248/549
6,793,358 B2 9/2004 Sakata
(Continued)

FOREIGN PATENT DOCUMENTS

| CN | 1375418 A | 10/2002 |
|---|---|---|
| CN | 1468754 A | 1/2004 |

(Continued)

OTHER PUBLICATIONS

Official Communication dated Sep. 29, 2018 issued in the corresponding Chinese Patent Application 201580066775.1.

*Primary Examiner* — George G King
(74) *Attorney, Agent, or Firm* — Carrlor Blackman & Associates, P.C.; Joseph P. Carrier; Anne G. Sabourin (57) ABSTRACT

A vehicle door mirror in which a pivoting member fixedly housed within a mirror housing on which a mirror is mounted is pivotably supported on a support shaft implanted in a base member mounted on a side door, wherein in order to restrict an end of pivoting of at least one of a forward inclined position and a rearward inclined position of the mirror housing, a restricting face is formed on one of the support shaft and the base member, and a restricting part is provided on the pivoting member, the restricting part being capable of making line contact with the restricting face in one plane orthogonal to an axis of the support shaft. This prevents excessive stress from occurring when restricting the range of pivoting of a mirror housing.

1 Claim, 6 Drawing Sheets

(58) Field of Classification Search
USPC .......................................... 359/841, 843, 871
See application file for complete search history.

(56) References Cited

U.S. PATENT DOCUMENTS

| | | | |
|---|---|---|---|
| 6,811,270 B2 | 11/2004 | Yoshida | |
| 9,987,987 B2 | 6/2018 | van Stiphout et al. | |
| 2013/0050857 A1* | 2/2013 | Sawada | B60R 1/074 359/841 |

FOREIGN PATENT DOCUMENTS

| | | |
|---|---|---|
| CN | 103237684 A | 8/2013 |
| JP | H09-142212 A | 6/1997 |
| JP | H11-198728 A | 7/1999 |
| JP | 2012-091742 A | 5/2012 |

* cited by examiner

VEHICLE DOOR MIRROR

TECHNICAL FIELD

The present invention relates to a vehicle door mirror in which a pivoting member fixedly housed within a mirror housing having a mirror mounted thereon is pivotably supported on a support shaft implanted in a base member mounted on a side door.

BACKGROUND ART

A vehicle door mirror in which a pivoting member fixedly housed within a mirror housing is pivotably supported on a support shaft of a side door-side base member is known from Patent Document 1.

RELATED ART DOCUMENTS

Patent Documents

Patent Document 1: Japanese Patent Application Laid-open No. 11-198728

SUMMARY OF THE INVENTION

Problems to be Solved by the Invention

In the arrangement disclosed in Patent Document 1 above, in order to restrict the range of pivoting for the mirror housing, flat restricting faces facing opposite sides along the peripheral direction of the support shaft are formed on projecting parts projectingly provided on the base member, a restricting projection having on opposite sides in the peripheral direction flat abutment faces that can abut against the restricting faces is projectingly provided on a gear case forming part of the pivoting member, and stress is concentrated in the base parts of the projecting part and the restricting projection by means of contact of the abutment face with the restricting face. When inclination of the pivoting member with respect to the axis of the support shaft occurs due to dimensional tolerances, assembly error, etc., the point of abutment of the abutment face on the restricting face changes, it becomes difficult to be certain of the abutment point, and if the abutment point moves toward the extremity side of the projecting part and the restricting projection, the stress concentrated in the base parts of the projecting part and the restricting projection increases.

The present invention has been accomplished in light of such circumstances, and it is an object thereof to provide a vehicle door mirror that prevents excessive stress from occurring when restricting the range of pivoting of a mirror housing.

Means for Solving the Problems

In order to attain the above object, according to an aspect of the present invention, there is provided a vehicle door mirror in which a pivoting member fixedly housed within a mirror housing on which a mirror is mounted is pivotably supported on a support shaft implanted in a base member mounted on a side door, characterized in that in order to restrict an end of pivoting of at least one of a forward inclined position and a rearward inclined position of the mirror housing, a restricting face is formed on one of the support shaft and the base member, and a restricting part is provided on the pivoting member, the restricting part being capable of making line contact with the restricting face in one plane orthogonal to an axis of the support shaft.

Effects of the Invention

In accordance with the aspect of the present invention, the restricting part provided on the pivoting member comes into line contact with the restricting face formed on the support shaft or the base member in one plane orthogonal to the axis of the support shaft, and it is thereby possible to relatively freely set the point of abutment of the restricting part on the restricting face, and it is possible, by setting a short distance for the distance from the point at which stress is concentrated to the abutment point, to prevent the stress occurring when pivoting is restricted from becoming excessively large.

EXPLANATION OF REFERENCE NUMERALS AND SYMBOLS

11 Side door
12 Base member
13 Mirror
14 Mirror housing
46 Restricting face
48 Restricting part

MODES FOR CARRYING OUT THE INVENTION

An embodiment of the present invention is explained below by reference to the attached FIG. 1 to FIG. 6.

First Embodiment

Figure 1:
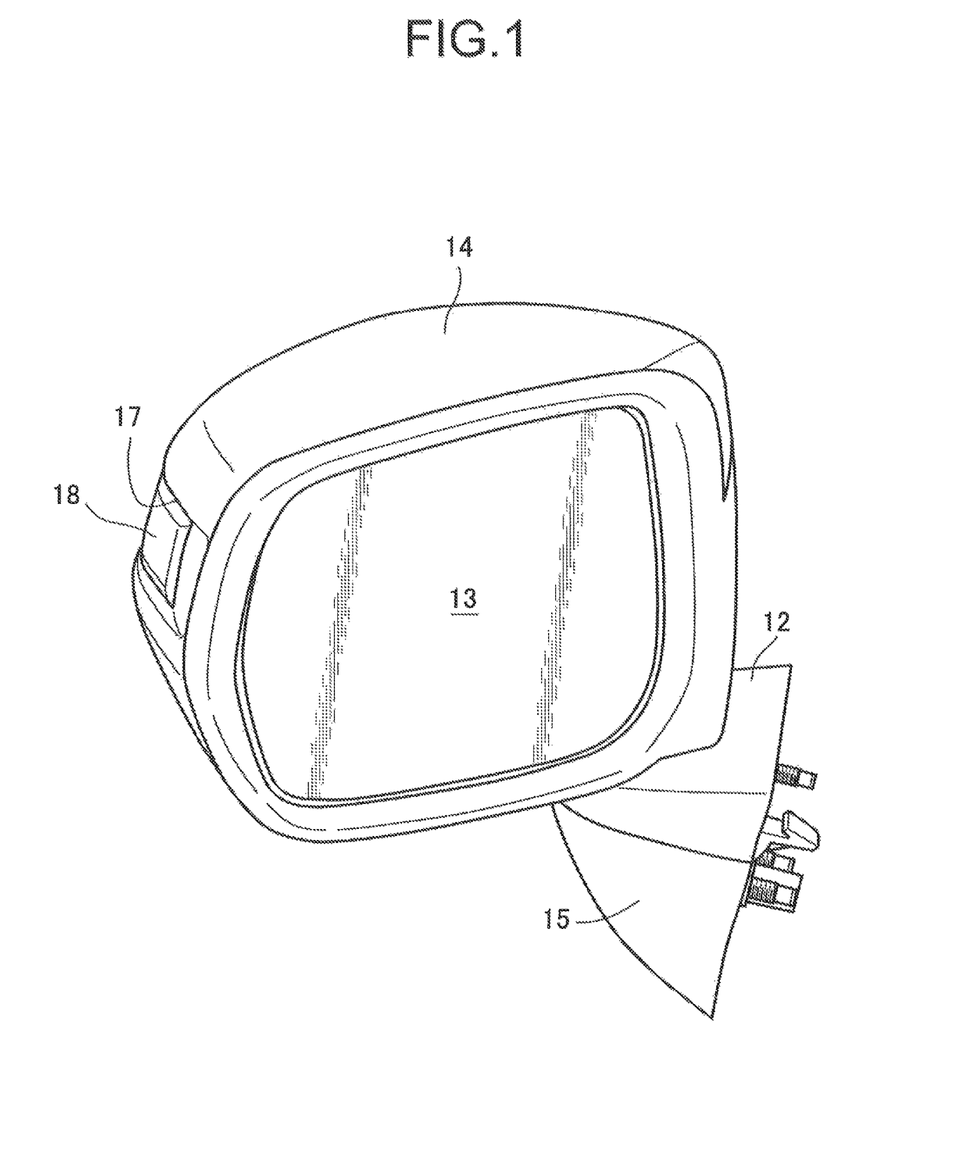
FIG. 1 is a perspective view of a vehicle door mirror at a raised position when viewed obliquely from the rear. (first embodiment)
Figure 2:
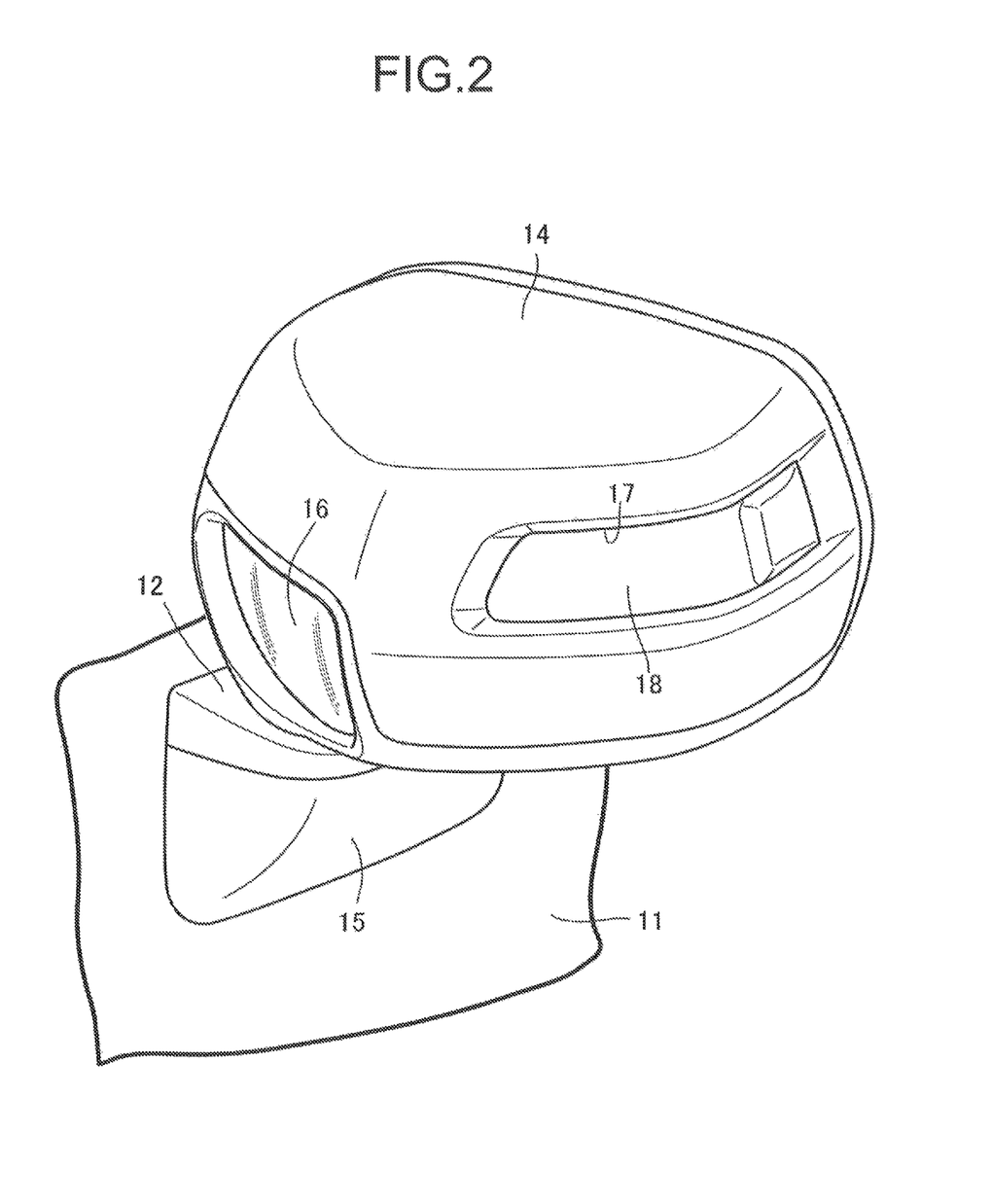
FIG. 2 is a perspective view of the vehicle door mirror at the raised position when viewed obliquely from the front. (first embodiment)

First, in FIG. 1 and FIG. 2, a base member 12 is mounted on a side door 11 on the passenger seat side of a four wheel passenger vehicle, a mirror housing 14 on which a mirror 13 is mounted is supported on the base member 12 so that the mirror housing 14 can pivot between a forward inclined position and a rearward inclined position, and a base cover 15 covering a lower part of the base member 12 is mounted on the lower part of the base member 12.

A vision assistance mirror 16 is mounted on the mirror housing 14 so as to face forward when the mirror housing 14 is at a raised position in which it projects sideways from the side door 11. This vision assistance mirror 16 is for viewing the side of the vehicle in front of the side door 11 on the passenger seat side, and a driver can view the side of the vehicle in front of the side door 11 on the passenger seat side by means of a mirror (not illustrated) disposed in a front part within a vehicle compartment and the vision assistance mirror 16.

Furthermore, provided in the mirror housing 14 is an opening 17 that opens toward the side and the rear when the mirror housing 14 is at the raised position, a side turn lamp 18 facing the opening 17 being mounted on an inner face of the mirror housing 14.

Figure 3:
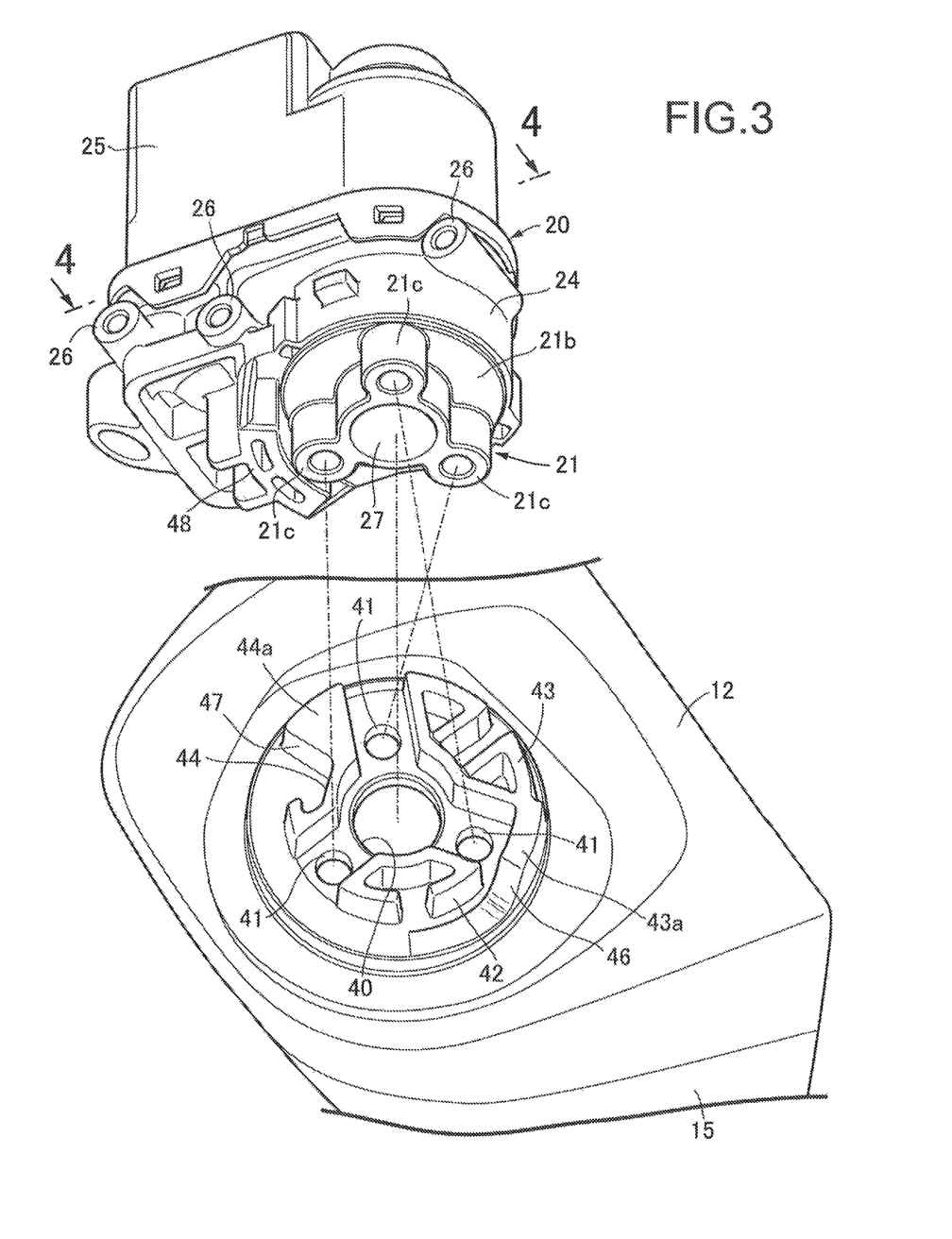
FIG. 3 is an exploded perspective view of a base member and an electric retraction unit in a state in which a support shaft is inserted. (first embodiment)
Figure 4:
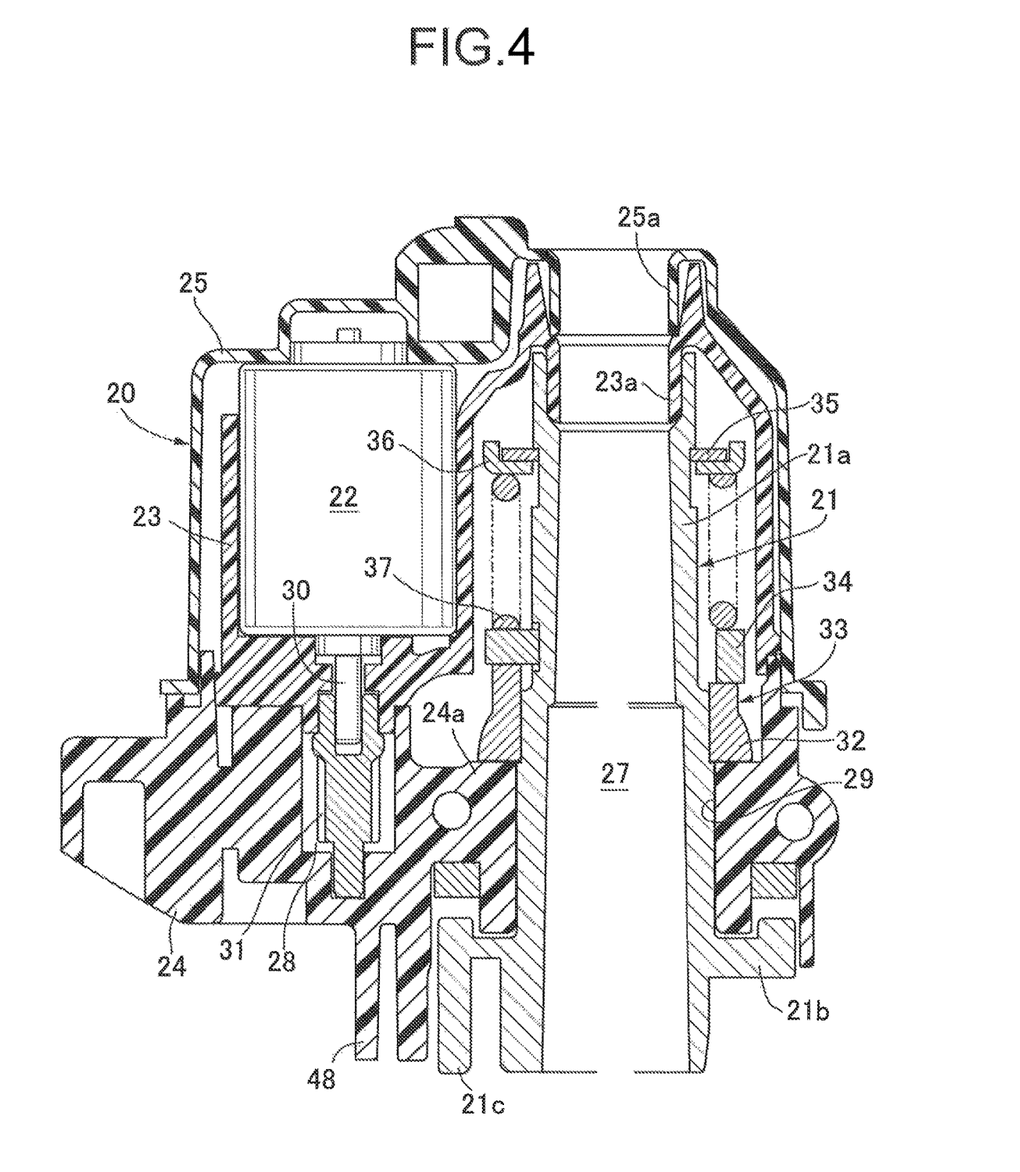
FIG. 4 is a sectional view along line 4-4 in FIG. 3. (first embodiment)

In FIG. 3 and FIG. 4, an electric retraction unit 20 is fixedly housed within the mirror housing 14, this electric retraction unit 20 being pivotably supported on a support shaft 21 implanted in the base member 12.

The electric retraction unit 20 is formed by joining to each other a motor case 23 that houses part of an electric motor 22 having a rotational axis parallel to the support shaft 21 and that supports the electric motor 22, a gear case 24 as a pivoting member forming a gear chamber 28 between itself and the motor case 23 and being joined to the motor case 23 from below, and a cover 25 that covers the motor case 23 as well as the electric motor 22, and a plurality of boss parts 26 that are to be fastened to an inner face of the mirror housing 14 are projectingly provided integrally with a side face of the gear case 24.

The support shaft 21 integrally has a cylindrical shaft portion 21a having a center hole 27 and extending in the vertical direction, a collar portion 21b protruding sideways from a lower part of the shaft portion 21a, and cylindrical mounting boss portions 21c formed so as to be connected to the lower end part of the shaft portion 21a and the collar portion 21b at three positions spaced at an equal interval in the peripheral direction of the shaft portion 21a, the support shaft 21 being formed from a light alloy such as a zinc alloy.

A first bearing portion 24a is formed on a lower part of the gear case 24 so as to be pivotably supported by the shaft portion 21a, the first bearing portion 24a having a through hole 29 through which the shaft portion 21a of the support shaft 21 extends. A cylindrical second bearing portion 23a is formed integrally with the motor case 23, the cylindrical second bearing portion 23a being fitted into an upper end part of the shaft portion 21a so as to be pivotably supported by the upper end part of the shaft portion 21a. Furthermore, a cylindrical portion 25a is formed integrally with the cover 25, the cylindrical portion 25a being fitted into an upper part of the motor case 23 so as to be coaxially connected to the upper end of the shaft portion 21a.

A drive gear mechanism 33 is housed within the gear chamber 28. The drive gear mechanism 33 has a worm gear 31 coaxially and relatively non-rotatably linked to an output shaft 30 of the electric motor 22, a gear train (not illustrated) transmitting rotational power from the worm gear 31, and a clutch gear 32 to which the power is transmitted from the gear train, the clutch gear 32 being rotatably fitted onto the shaft portion 21a of the support shaft 21 while abutting against the first bearing portion 24a.

A clutch plate 34 sandwiching the clutch gear 32 between itself and the first bearing portion 24a is non-rotatably but axially movably fitted around the shaft portion 21a, and a coil-shaped clutch spring 37 is provided in a compressed state between the clutch plate 34 and a retainer 36 that is received by a retaining ring 35 fitted around the shaft portion 21a at a position close to the second bearing portion 23a.

In a state in which an external force of a predetermined value or greater is not acting on the mirror housing 14, the clutch gear 32 is prevented from rotating around the axis of the shaft portion 21a by being held between the first bearing portion 24a and the clutch plate 34, and if the electric motor 22 operates in this state, the electric retraction unit 20, that is, the mirror housing 14, pivots around the axis of the shaft portion 21a between a retracted position in which it is retracted to the side door 11 side and a raised position in which it projects sideways from the side door 11.

On the other hand, when an external force of a predetermined value or greater acts on the mirror housing 14, the clutch gear 32 can pivot around the axis of the shaft portion 21a between a rearward inclined position and a forward inclined position while slipping between the first bearing portion 24a and the clutch plate 34, thus enabling the mirror housing 14 to be manually pivoted or the mirror housing 14 to be pivoted by the impact of contact with another obstacle. In this embodiment, the rearward inclined position is set at the same position as the retracted position, and the forward inclined position is set at a position that is pivoted further forward than the raised position.

Referring to FIG. 3, the lower ends of the shaft portion 21a and the mounting boss portions 21c of the support shaft 21 abut against an upper face of the base member 12. Formed in the upper face of the base member 12 are a through hole 40 coaxially communicating with the center hole 27 of the support shaft 21 and insertion holes 41 disposed on the periphery of the through hole 40 so that a bolt (not illustrated) that is to be screwed into the mounting boss portion 21c of the support shaft 21 is inserted through the insertion hole 41, and projectingly provided integrally with the upper face of the base member 12 are first, second and third ribs 42, 43 and 44 sandwiching the insertion holes 41 from opposite sides in the peripheral direction.

In order to restrict the end of pivoting on the forward inclined position and the rearward inclined position (retracted position) side of the mirror housing 14, restricting faces 46 and 47 are formed on one of the support shaft 21 and the base member 12, and a restricting part 48 that can make contact with the restricting faces 46 and 47 is provided on the gear case 24. In this embodiment, the restricting face 46 for restricting the end of pivoting on the forward inclined position side of the mirror housing 14 is formed on the extremity of an extending portion 43a joined integrally to an outer peripheral part of the second rib 43 and extending in an arc shape up to a position where it covers part of the first rib 42 from the outside, and the restricting face 47 is formed on a wide portion 44a formed into a fan shape so as to widen in going outward in the radial direction of the through hole 40 while forming part of the third rib 44, the restricting face 47 facing the opposite side to the restricting face 46 in the peripheral direction of the through hole 40.

On the other hand, the restricting part 48 is projectingly provided integrally with the gear case 24 so as to be disposed between the extending portion 43a and the wide portion 44a, and is formed into an arc shape having its center on the axis of the shaft portion 21a of the support shaft 21. Due to one end part in the peripheral direction of the restricting part 48 abutting against the restricting face 46, the end of pivoting on the forward inclined position side of the mirror housing 14 is restricted, and due to the other end part in the peripheral direction of the restricting part 48 abutting against the restricting face 47, the end of pivoting on the rearward inclined position (retracted position) side of the mirror housing 14 is restricted.

Figure 5:
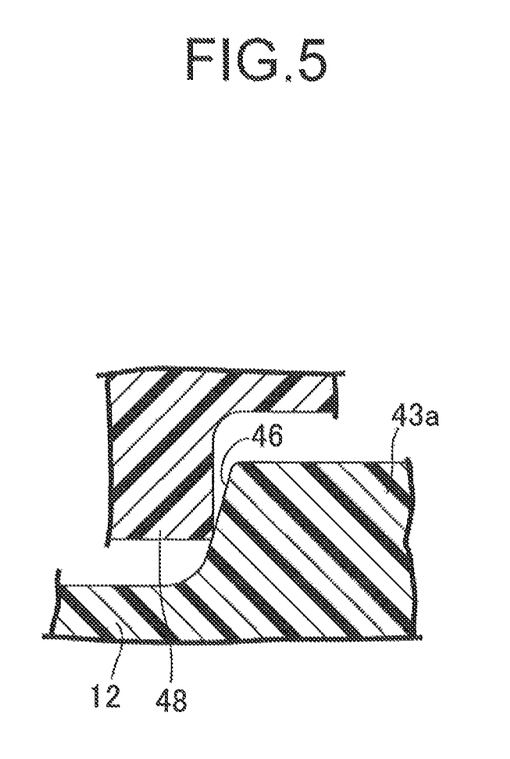
FIG. 5 is a sectional view showing a state in which the end of pivoting on a forward inclined position side is restricted. (first embodiment)

In accordance with the present invention, the restricting part 48 makes line contact, in one plane orthogonal to the axis of the support shaft 21, with at least one of the restricting faces 46 and 47 formed on the base member 12 in order to restrict the ends of pivoting on the forward inclined position side and the rearward inclined position side of the mirror housing 14, and in this embodiment as shown in FIG. 5 the restricting face 46 for restricting the end of pivoting on the forward inclined position side of the mirror housing 14 is formed as an inclined face that becomes higher in going toward one side along the peripheral direction of the support shaft 21, and due to a corner part on one end side in the peripheral direction of the restricting part 48 abutting against the restricting face 46 the restricting part 48 makes line contact with the restricting face 46 in one plane orthogonal to the axis of the support shaft 21.

Figure 6:
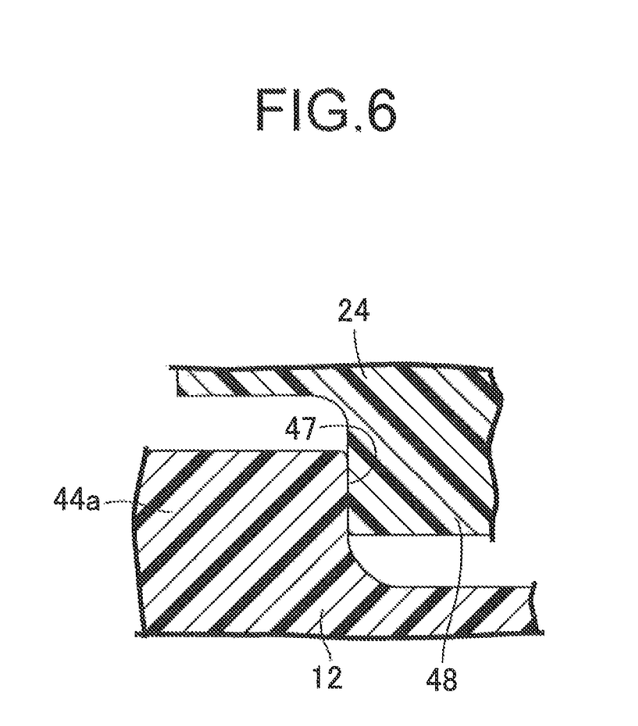
FIG. 6 is a sectional view showing a state in which the end of pivoting on a rearward inclined position side is restricted. (first embodiment)

The reason why the end of pivoting is restricted by the line contact is because stress concentrated in a portion forming the restricting face and the base part of the restricting part 48 increases due to it becoming difficult to be certain of the point of abutment against the restricting face. If it has the strength to be able to withstand a large stress, such a measure becomes unnecessary; the restricting face 47 for restricting the end of pivoting on the rearward inclined position side of the mirror housing 14 is formed on the wide portion 44a that is formed so as to be relatively long in the radial direction of the through hole 40 on the upper face of the base member 12 and, moreover, relatively wide along the peripheral direction, and it has the strength to be able to withstand a large stress concentrated in the base part of the wide portion 44a. In this embodiment, as shown in FIG. 6, the restricting part 48 is set so as to make surface contact with the restricting face 47, but line contact similar to the line contact of the restricting part 48 with the restricting face 46 may be carried out between the restricting part 48 and the restricting face 47.

The operation of this embodiment is now explained. In order to restrict the end of pivoting on at least one of the forward inclined position side and the rearward inclined position side of the mirror housing 14, in this embodiment the end of pivoting on the forward inclined position side, the restricting face 46 is formed on one of the support shaft 21 and the base member 12 (in this embodiment the base member 12), the restricting part 48, which can come into line contact with the restricting face 46 in one plane orthogonal to the axis of the support shaft 21, is provided on the gear case 24, it is thereby possible to relatively freely set the point of abutment of the restricting face 46 on the restricting part 48, and it is possible, by setting a short distance for the distance from the stress concentration point to the abutment point, to prevent the stress occurring when pivoting is restricted from becoming excessively large.

An embodiment of the present invention is explained above, but the present invention is not limited to the above embodiment and may be modified in a variety of ways as long as the modifications do not depart from the spirit and scope thereof.

For example, in the above embodiment the door mirror in which the mirror housing 14 is pivoted between the raised position and the retracted position by means of the power of the electric motor 22 is explained, but the present invention can be applied to a manual type door mirror that is not equipped with an electric motor. In this case, a restricting face provided on a support shaft and a restricting member provided on a pivoting member fixedly housed within a mirror housing are made to come into surface contact.

The invention claimed is:

1. A vehicle door mirror comprising
   a pivoting member fixedly housed within a mirror housing on which a mirror is mounted and said pivoting member is pivotably supported on a support shaft implanted in a base member mounted on a vehicle side door, said support shaft having a center hole formed therein, and the base member having a through hole coaxially communicating with the center hole of the support shaft, and the base member having an upper face with insertion holes disposed on the upper face thereof, and projectingly provided integrally with the upper face of the base member are first, second and third ribs sandwiching the insertion holes from opposite sides in the peripheral direction, and including first and second restricting faces formed on opposing sides of the through hole of the base member, wherein the first restricting face is formed on the extremity of an extending portion joined integrally to an outer peripheral part of the second rib and extending in an arc shape up to a position where it covers part of the first rib from the outside, and the second restricting face is formed on a wide portion formed into a fan shape so as to widen in going outward in a radial direction of the through hole while forming part of the third rib, the second restricting face facing the opposite side to the first restricting face in the peripheral direction of the through hole, wherein a restricting part is projectingly provided so as to be disposed between the extending portion and the wide portion, and is formed into an arc shape having its center on the axis of a shaft portion of the support shaft, and the restricting part abutting against the first restricting face restricts an end of pivoting on a forward inclined position and the restricting part abutting against the second restricting face restricts an end of pivoting on the rearward inclined position of the mirror housing.

* * * * *